July 28, 1942.  E. MUCHOW  2,291,554
ADJUSTABLE THERMOSTAT
Filed March 6, 1937  2 Sheets-Sheet 1

INVENTOR:
ELMER MUCHOW,
By Lawrence C. Kingsland
ATTORNEY

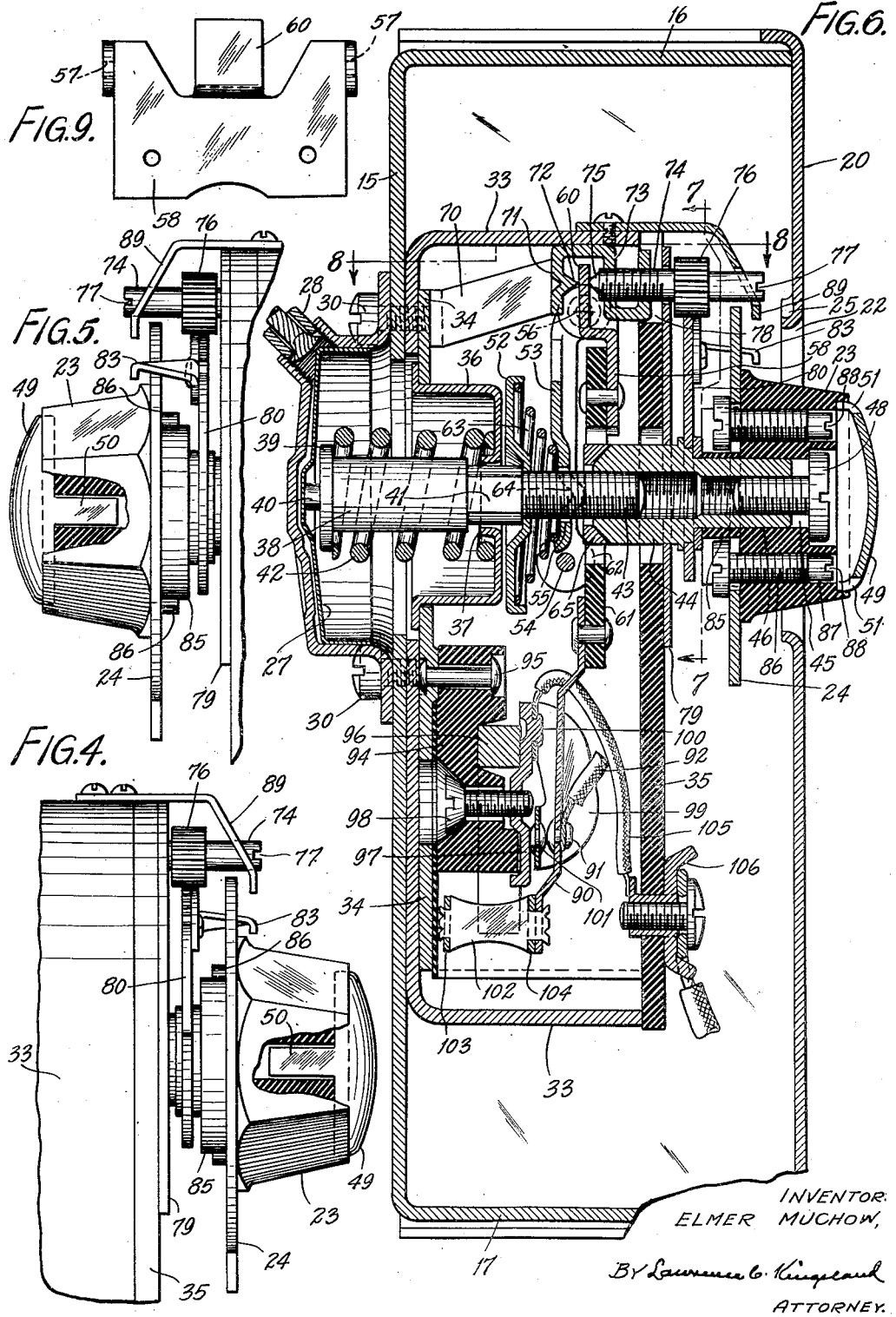

Patented July 28, 1942

2,291,554

UNITED STATES PATENT OFFICE 2,291,554

ADJUSTABLE THERMOSTAT

Elmer Muchow, St. Louis, Mo., assignor, by mesne assignments, to Automatic Control Corporation, St. Louis, Mo., a corporation of Delaware Application March 6, 1937, Serial No. 129,367

14 Claims. (Cl. 200—83)

The present invention comprises a thermostat having certain novel arrangements of the working parts, especially as to the adjustments thereof. The thermal means of the device operates a cut-off mechanism, here shown as an electric switch; and, in view of the fact that it is desirable to have the thermostat on increase of heat operate at a different point than upon decrease of heat, the present device comprehends such a differential and an adjuster therefor. In connection with this adjuster there is a range dial presettable so as to register proper temperatures and also means cooperating therewith to indicate both critical temperatures at which the switch is operated.

It is an object of the invention to provide a differential adjusting mechanism for a thermostat, having accessible adjusting means.

It is a further object of the invention to provide in a thermostat means for indicating the temperatures at which the device operates both upon ascending and descending heat conditions.

It is a further object of the invention to provide in this connection a single dial means upon which both of these temperatures are indicated.

It is a further object of the invention to relate the dial means aforesaid with the main thermostat adjustment.

It is a further object of the invention to provide a dial of this type that is presettable or adjustable so that it may be made to indicate the actual temperature of the thermal element.

In the drawings—

Fig. 1 is a front view of the thermostat in its casing.

Fig. 2 is a side view thereof.

Fig. 3 is a front view with the main casing or cover removed.

Fig. 4 is a side vertical section of the indicating means and certain related parts taken on the line 4—4 of Fig. 3.

Fig. 5 is a view similar to Fig. 4 but from the opposite side and taken on the line 5—5 of Fig. 3.

Fig. 6 is a vertical middle section taken on the line 6—6 of Fig. 3.

Fig. 7 is a vertical section looking from the front of the instrument and taken on the line 7—7 of Fig. 5.

Fig. 8 is a horizontal section looking down and taken on the line 8—8 of Fig. 6.

Fig. 9 is a view of the secondary lever engageable with the differential mechanism.

Fig. 10 is a view of the primary lever taking the movement of the thermal element and adapted for interconnection with the secondary lever aforesaid.

The mechanism is mounted upon a base 15 that has end members 16 and 17 and narrow side flanges 18 and 19. A cover 20 engages over this base member 15 and is secured thereto by means of screws 21 that are threaded into the side flanges 18 and 19. This cover 20 has a front opening 22 therein through which extends an adjusting knob 23. An extension of the opening 22 permits the dial 24 to be seen and on one edge of this extension there is provided an index 25 adapted for cooperation with the dial.

Secured to the back of the base 15 and surrounding an opening therethrough is a flanged cup-like member 26. Within this cup-like member 26 there is secured a flexible diaphragm member 27 also of cup-shape and united with the member 26 around its edges, whereby the central portion may act as a diaphragm. A tube 28 extends at an angle from one corner of the member 26 to which tube at its remote end there is connected a bulb 29. The bulb, tube and any space between the member 26 and the diaphragm 27 are filled with liquid. The diaphragm member is normally contiguous to the member 26 and is moved away therefrom upon expansion of the fluid by application of heat to the bulb 29. These members 26 to 29, inclusive, constitute the thermal element of the device and are attached to the frame 15 by means of four screws 30. Although the structure now to be described may be used with other thermal means, it is particularly valuable with this type, which is "solid-charge," providing invariable expansion of a given amount, the maximum normally being about .30 inch.

Located within the frame 15 there is an inner casing 33 threaded to receive the screws 30 by means of which this inner frame and the structure mounted upon it are supported on the outer frame 15. This inner frame 33 is box-like but open at its front side. There fits within this inner frame 33 a bridge element 34 U-shaped in horizontal cross-section, as shown in Fig. 8. An insulating front plate 35 is secured to the bridge 34, there being projections upon the latter that pass through the plate and are peened over to secure the members together. When the bridge 34 with its plate 35 thereon are fitted into the inner casing 33, the fit is precise so that the bridge may be engaged by the screws 30 and the insulating plate 35 will enclose the open front side of the inner casing 33. Thus, the screws 30 pass through the cup-shaped member 26, the frame 15, the inner frame 33 and are ultimately threaded into the bridge 34 so that all of these several elements are held together by these screws 30.

Secured to the bridge 34 and extending through a wall thereof and located in opposition to the cup-shaped member 26 there is a flanged cup-like element 36. This element 36 has centrally of the bottom thereof a non-circular flanged opening 37. Through this opening is fitted a power-receiving member 38 having a flange 39 on one end thereof and a projection 40 extending from the flange. The member 38 likewise has a flattened section 41 complementary to the opening 37 and fitting therethrough whereby it is maintained against rotation but is permitted to move axially. A relatively stiff coil spring 42 surrounds the member 38 and engages against the cup-like element 36 and the flange 39 of the power member 38 to maintain the member in its most backward position so that the lug 40 is held in contact with the expansible diaphragm 27.

The other end of the member 38 has a portion 43 provided with a left-handed thread, around which threaded portion is placed a sleeve 44 correspondingly threaded. The knob 23 has an internal bore 45 therethrough whereby the knob may be fitted over the sleeve 44 to engage against a shoulder thereon. As shown in Fig. 7 the sleeve 44 is flattened at 46, there being a corresponding flattened portion in the knob 23 so that relative rotation between the two is prohibited. A headed screw 48 maintains the knob onto the sleeve 44 and is made accessible by removal of a cap 49 on the knob 23. This cap, in turn, has spring-like extensions 50 thereon that fit in openings within the knob and retain the cap in place. Openings 51 adjacent the edges of the cap are adapted to receive a tool so that the cap may be pried loose.

A washer 52 surrounds the member 38 adjacent the cup-like element 36. A primary lever 53, shown in Fig. 10, is pivoted at 54 to the side walls of the bridge element 34. This primary lever has an opening 55 to pass over the threaded portion 43 of the member 38. At its opposite end the primary lever has pivot elements 56 on opposite flanges, these pivot elements being engageable in openings 57 provided in upstanding flanges on a secondary lever 58. Between these two flanges on the secondary lever there is provided an offset fulcrum plate extension 60. Secured to the secondary lever and forming an extension thereof is an insulating plate 61. This plate is provided with an opening 62 to receive the sleeve 44 and by means of which the secondary lever crosses the aforesaid sleeve.

A tapered coil spring 63 surrounds the member 38 and is compressed between the washer 52 and the primary lever 53. It thus forces the primary lever toward the front of the instrument. This primary lever is provided with upstanding lugs 64 adjacent the opening 55 and which are caused by the spring 63 to abut a washer 65 fitting against the sleeve 44. Thus the primary lever 53 is maintained against the washer 65 so that, as the latter is moved out upon expansion of the diaphram 27, the primary lever will follow this movement. The secondary lever 58 by virtue of its connection with the primary lever will likewise be moved.

The movement of the secondary lever, however, is under the control of the differential mechanism now to be described. A bracket 70 is secured to the bridge 34 adjacent the top end thereof and extends from the back of the instrument toward the front thereof. This bracket is provided with a ledge 71 upon which is formed a knife-edge fulcrum 72. The bracket likewise has a U-shaped extension 73 formed integrally therewith and through opposed legs of which is threaded an adjusting screw 74 having on the end thereof a fulcrum 75. The extension 60 on the secondary lever 58 extends between the two fulcrums 72 and 75.

A relatively wide gear 76 is formed on the screw 74 and a kerf 77 is provided in the outer end of the screw that extends adjacent the front of the instrument. An opening 78 is provided in the insulating plate 35 for passage of this adjusting mechanism. A reinforcing plate 79 may be located on the front of the insulating plate 35. This plate 79 has an opening to receive the screw 74, and an opening to receive the sleeve 44 and to guide the same in its axial movement.

A segmental gear 80 is rotatably mounted on the sleeve 44, being held between a flange thereon and the knob 23. As shown in the drawings the knob 23 engages against a shoulder on the sleeve 44 so that it cannot bind the gear 80. This gear 80 is provided with stops 81 and 82 at its extensions (Fig. 7), these stops striking the gear 76 to limit movement of the segmental gear 80. An index pointer 83 is mounted upon the segmental gear 80 and upstands therefrom.

The dial member 24 of annular shape is mounted around a circular projection 85 extending from the back of the knob 23 by cap screws 86 that fit into indentations of the projection 85 on the back of the knob. The caps of these screws overhang the dial plate 85 whereby it is held in position. These screws have left-handed threads and the openings 87 through the knob into which they are threaded extend completely through to the front thereof, beneath the cap 49. Kerfs 88 are provided in the screws 86 so that upon removal of the cap 49 a screw driver may be engaged with the kerfs 88 and the screws loosened. By this means the dial member may be adjusted and then secured in adjusted position by tightening of the screws. Through the medium of the left-handed threads the screws are tightened by clockwise rotation of a screw driver engaged in the kerfs 88.

The pointer 83 on the segmental gear 80 overhangs the dial plate 84 and cooperates therewith. There is likewise provided a pointer 89 secured to the inner casing 33 and overhanging this dial plate immediately beneath the index 25 on the main casing. By means of this supplemental pointer 89 the instrument may be adjusted with the main casing removed.

Upon the outer end of the extension 61 of the secondary lever 58 there is provided a switch blade 90. A contact 91 to which is connected an electric lead 92 is mounted upon the blade 90. This electrical lead 92 leads to a suitable terminal 93 (Fig. 3) upon the insulating plate 35 of the instrument.

A block of insulating material 94 is secured to the bridge 34 by means such as rivets 95. A horse-shoe magnet 96 is secured to this insulating block 94, it being clamped thereto by a switch element 97, and a screw 98 engaging the insulating block 94 and this switch member 97. A switch plate 99 of U-shape has one leg secured to the switch member 97, as shown at 100. The free leg of the member 99 carries a contact 101 which, while it is permitted limited movement by the flexibility of the plate 99, may nevertheless be referred to as the fixed contact.

The switch blade 90 extends beyond the contact 91 and at its outer end carries a two-way armature 102 having cross plates 103 and 104 alternately brought within the field of the magnet 96 as the switch opens or closes. This magnet and armature arrangement provides a snap action for the switch.

An electrical lead 105 is connected to the switch plate 99 and extends to a terminal 106 which is similar in all respects to the terminal of the lead 93 previously mentioned.

The operation of the device is as follows:

In accordance with the showing of Fig. 3 the device is employed to maintain the temperature of a certain locality at a minimum of 40°. In other words, if the temperature drops below 40°, the switch will be closed and a heating mechanism cut into operation to raise the temperature.

The bulb 29 will be located at a point the temperature of which is to be controlled. As the liquid within this bulb and connected parts becomes hotter it expands and consequently moves the diaphragm 27 toward the front of the instrument. This movement is positive and invariable, since the entire system is filled with liquid, no gas being present. The reverse action takes place upon cooling of the bulb and liquid. As the diaphragm 27 expands the power member 38 is moved frontwardly against the action of its spring 42, which spring maintains its projection 40 in contact with the diaphragm. The sleeve 44 moves frontwardly with the power member 38 upon which it is mounted. Since the spring 63 maintains the primary lever 53 in contact with the washer 65 through the abutments 64, the primary lever is caused to pivot clockwise in Fig. 6 upon expansion of the diaphragm 27. The pivots 56 on the primary lever 53 transmit this movement to the upper end of the secondary lever 58. Upon such expansion, as soon as the extension 60 of the secondary lever engages the fulcrum 75 on the screw 74, free movement of the secondary lever 58 stops and this lever is caused to pivot counterclockwise about this fulcrum 75, causing the switch to be opened.

When the switch is closed, the cross bar 104 of the armature 102 is close to the poles of the magnet 96 and consequently affords resistance to movement. However, as the force acting upon the secondary lever builds up, it will exceed the resistance of the magnet and commence movement of the switch blade. As the movement of the cross bar 104 away from the magnet takes place, the drawing power of the magnet upon the cross bar decreases. Shortly also the other cross bar 103 will come within the field of the magnet so that the switch will be caused to open with a snap action.

As shown in Fig. 3 the screw 74 is adjusted so that the switch will open at approximately 52°. In this connection it will be observed that the pitch of the threads on the screw 74 and the relation between the gears 76 and 80 is such that the spacing of the main dial 24 fits the adjustment of this screw and its fulcrum. In other words, the differential adjustment indication is coordinated with the main instrument adjustment, which latter is to be described subsequently.

It, therefore, will be seen that the switch will be opened at about 52°. In the present showing the temperature is increasing and is approximately to the value at which the switch will open.

Upon decrease of temperature, caused by the deenergization of the heating system when the switch is open, the diaphragm 27 will recede toward the member 26. Its movement is followed by the power member 38, the latter being influenced by its spring 42. The sleeve 44 necessarily follows the power member 38 and causes, through action of the washer 65 upon the abutments 64, the primary lever to be moved counterclockwise in Fig. 6. The primary lever correspondingly moves the upper end of the secondary lever 58 away from the fulcrum 75.

The first part of this movement of the secondary lever is free, the extent of the free movement being determined by the differential setting. When, however, the extension 60 on the secondary lever 58 strikes the fulcrum 72, the movement of the secondary lever then becomes restricted and further movement of the primary lever pivots the secondary lever about the fulcrum 72 and in a clockwise direction in Fig. 6. This will cause the switch to close with a snap action, the latter, of course, being obtained through the magnets in the manner previously described. As previously indicated, the switch closes in the illustrations, when the temperature drops to 40°.

Rotation of the knob 23 adjusts the temperatures at which the switch operates, by displacing the sleeve 44 attached thereto, and which is threaded onto the power member 38. Rotation of this knob counterclockwise forces the washer 65 inwardly and the primary lever 53 counterclockwise (Fig. 6). This correspondingly draws the extension 60 of the secondary lever 58 close to the fixed fulcrum 72. Hence, less movement of the power means toward the back of the instrument is necessary to close the switch, and the temperature at which the switch closes is raised. Correspondingly, the temperature at which the switch will open is raised. Turning the main knob 23 clockwise reverses this procedure and decreases the temperatures at which the mechanism operates, since such clockwise rotation withdraws the washer 65 and permits the primary lever to move the extension 60 of the secondary lever 58 further away from the fulcrum 72, whereby greater temperature drop is necessary to close the switch.

The adjustment of the differential is independent of the setting of the knob 23. When the screw 74 is turned the fulcrum 75 is moved further away from the fixed fulcrum 72. Consequently, although the temperature of operation upon decrease of heat remains constant as determined by the particular setting of the knob 23 that upon increase of heat is raised above that previously existing; since, if the fulcrum 75 is withdrawn, the diaphragm 27 must move the primary lever further before it, in turn, brings the secondary lever into contact with the fulcrum 75. Consequently, the switch will remain closed until a higher temperature is reached. The adjustment of the screw 77 moves the pointer 83 about the dial 24 so that the latter always indicates the temperature at which the switch will open. A subtraction of the value indicated by the main pointer 25 or the inner one 89 from that indicated by the pointer 83 gives the differential in reverse. Thus, it is shown as 12° in Fig. 3. This differential remains constant through variation of the knob 23, and hence, if the knob 23 be adjusted so that the instrument operates at 60°, the pointer 83 will then indicate 72. This result obtains from the fact that the knob 23 adjusts the movement of the primary lever that carries all movements of the diaphragm, whereas the screw 74 adjusts only one position of the secondary lever. It will be observed that the gear 76 is sufficiently wide to remain in mesh with the segment 80 in any position axially that the latter may assume in accordance with the action of the diaphragm.

In order to make the dial indicate the proper temperature, the bulb is cooled down to some known temperature, such as 40°. The knob 23 is then adjusted until the switch just closes. When the switch closes rotation of the knob is immediately stopped. The cap 49 is removed and the screws 86 are loosened. The dial 24 may then be turned by hand until the indication 40 thereon registers with the pointer 89. Following this the screws 86 are again tightened and the cap replaced. In this adjustment the inner pointer 89 is used, whereas for ordinary adjustments of the thermostat setting by turning the knob 23, with the casing 20 in place, the pointer 25 is used.

Thus it may be seen that a completely adjustable thermostat has been provided wherein the temperature setting for operations of the instrument may readily be made; wherein the differential may conveniently be adjusted; and wherein the operating temperatures both upon rise of temperature and fall thereof are always indicated. Also these latter indications are made on the same dial, which is the main one. The mechanism is particularly applicable to a solid-charge, low motion, diaphragm type instrument, since the leverages are designed to produce a high degree of multiplication, although it is manifest that with only minor changes, the structure could be made for use with any type power means, having large or small movement, and operated by temperature, pressure, or through power means producing movement.

What is claimed is:

1. In a device of the kind described, a power means, a cut-off adapted to be actuated thereby, motion transmitting means interpolated between the power means and the cut-off for moving the latter into two positions in response to movement of the power means, said transmission means moving the cut-off to one of its positions at one value of the power means and to its other position at another value of the power means, means to adjust together both of said values at which said cut-off is actuated, means independently to adjust one of said values, and means to indicate both of said values, said means having a member movable with said first adjusting means and two elements cooperable therewith during adjustments thereof, and one of said elements being connected with the second adjustment for independent operation therewith, whereby altering the first adjustment does not change the differential between the values and indicates adjusted values of both with such constant differential, and altering the second adjustment changes the differential and one value and indicates it.

2. In a device of the kind described, an expansible member, a cut-off including an element adapted to be moved in two directions, transmission means interpolated between the expansible member and the movable element for moving the latter in response to expansion and contraction of the former, means for adjusting the transmission means relative to the expansible member whereby to adjust the points at which the cut-off is actuated in both directions, means including a dial and two pointers for indicating the values at which said cut-off is actuated upon movement of the expansible member, the dial being connected with said adjusting means to be adjusted therewith under said pointers, one of the pointers being adjustable, said transmission means including mechanism to provide a differential whereby the point at which the cut-off is actuated by movement of the expansible member in a first direction is at a different value from the point of actuation in the other direction aforesaid, and means connecting the differential mechanism and the adjustable pointer for indicating on the dial the value of actuation of said cut-off in said last-named direction of travel, said fixed pointer indicating on the dial the value of actuation in the first named direction of travel.

3. In a device of the kind described, an expansible member, a cut-off, transmission means interpolated between the expansible member and the cut-off for actuation of the latter in two directions upon expansion and contraction of the expansible member, said transmission means including a primary lever, a secondary lever actuated by the primary lever, a pair of fulcrums for the secondary lever, one of which is fixed, a rotatable member for adjusting the relation of the primary lever to the expansible member to vary the conditions of the expansible member in which the primary lever is actuated, means including a dial for indicating the condition of operation of the expansible member when the secondary lever is shifted by the primary lever and in contact with the fixed fulcrum, means for adjusting the other fulcrum, and means for indicating on said dial the position of said expansible member at which said secondary lever is actuated by contact with said movable fulcrum.

4. In a device of the kind described, an expansible member, a lever, a pair of fulcrums for said lever, means for moving said lever oppositely in response to expansion and contraction of said expansible member, one of said fulcrums being adjustable, rotatable means for adjusting the same, rotatable means for adjusting said moving means, and indicating means for showing the position of both said rotatable means, said indicating means comprising a single dial, cooperable with two indices, one of the latter indicating on said dial the position of the expansible member at which said lever is operated when the same pivots about the movable fulcrum, and the other indicating the position of the expansible member at which the lever is operated when the same pivots about the fixed fulcrum.

5. In a device of the kind described, an expansible and contractible member, a cut-off, transmission means interposed between said cut-off and said member for actuation of the former by the latter, said transmission means including a member movable relative to the expansible member and a lever moved thereby, a pair of fulcrums for the lever, the first of which is adjustable, means for adjusting said movable member relative to said expansible member and thereby to adjust said lever relative to both said fulcrums, means including a dial for indicating the position of said expansible means at which said cut-off is actuated by shifting of said lever pivoted on the second fulcrum, means for adjusting said first fulcrum, and means for indicating on said dial the position of said expansible means at which said lever is shifted by pivoting about said first fulcrum.

6. In a device of the kind described, an expansible and contractible member, a lever, a pair of fulcrums on opposite sides of said lever, the first of which fulcrums is adjustable, a member for moving said lever, means connecting said moving member for actuation in opposite directions by said expansible and contractible member, such movements bringing the lever against one fulcrum upon expansion, and the other lever upon contraction, rotatable means adjusting the relative position of said connecting means and said moving member whereby to adjust the position of said expansible member at which said lever is pivoted about said fulcrums, means including a dial for indicating such position of operation relative to said second fulcrum, means for adjusting said first fulcrum, an index cooperable with said dial, and means interposed between said index and said fulcrum adjusting means for indicating on said dial the position of the expansible member at which the lever is pivoted about said first fulcrum.

7. A device as in claim 6, in which the fulcrum adjusting means is rotatable, and the dial is fixed on the rotatable adjusting means for said connecting means, a member rotatably mounted on said last-named adjusting means and carrying an index cooperable with said dial, and means connecting said fulcrum adjusting means and said rotatably mounted index member to move the index over the dial upon adjustment of the fulcrum.

8. In a device of the kind described, an expansible and contractible member, a cut-off adapted to be actuated thereby, differential transmission means connecting said member and cut-off for actuation of the latter at one position of the former upon expansion, and at another position upon contraction, rotatable means for adjusting both said positions and including indicating means having a dial and index for showing one of said positions, means for adjusting the other position relative to the one, and a second index adapted to be moved over said dial to indicate the latter position.

9. In a device of the kind described, a member expansible and contractible in response to temperature changes, a cut-off, transmission means for actuating said cut-off to on or off positions in response to movements of said member, a rotatable member for adjusting said transmission means to vary the position of the expansible member at which the cut-off is actuated to open position, a dial fixed to said rotatable member, a gear segment rotatable on said rotatable member, an index moved by said segment over said dial, additional means for adjusting said transmission means to adjust the positions of actuation of said cut-off when it is moved to closed position, a gear on said last-named adjusting means and meshing with said segmental gear whereby to move the index to indicate on said dial the adjustment of said last-named adjusting means.

10. In a device of the kind described, power means, a cut-off actuated thereby, means for transmitting the movement of the power means for actuation of the cut-off into two positions, said transmission means including a lever, an adjustable connection between the power means and the lever, an adjustable fulcrum for the lever, and means for indicating the position of the movable fulcrum including a dial and a pointer, one of which is adjustable with the adjustment of the lever and the other of which is adjustable with the adjustment of the fulcrum, whereby to show the condition of said power means at which said cut-off is actuated in its movement to one of its positions.

11. In a mechanism of the kind described, a power means, a cut-off adapted to be actuated thereby, means including a lever adapted to receive movement from the power means for transmitting the movement of the power means to operate the cut-off, snap-action means operating on one end of the lever, adjustable fulcrum means including two fulcrums, one adjustable relative to the other, said fulcrum means being adjacent the other end of the lever to provide shifting of the lever at different positions in the movements of the power means in its opposite direction of travel, and graduated scale means to indicate both of said positions of the power means, said scale means including a pointer and a scale movable relative thereto, the adjustable means causing said relative movement.

12. In a device of the kind described, a power means, a cut-off adapted to be actuated thereby, means including a lever for transmitting the movement of the power means to operate the cut-off, snap-action means operating on one end of the lever, said snap action means resistingly holding the said end of the lever in either of its two positions, an adjustable means adjacent the other end of the lever to cause the lever to move in one direction at a different position of movement of the power means from that position at which it moves in the opposite direction of movement of said power means, and graduated scale means to indicate both of the said positions, said scale means including a pointer and a scale movable relative thereto, the adjustable means causing said relative movement.

13. In a device of the kind described, a power means, a cut-off adapted to be actuated thereby, means including a lever, and mechanism connected between the power means and the lever to transmit movement of the former to the latter, to operate the cut-off, and an adjustable fulcrum means adjacent one end of said lever whereby the lever will move at a different point in one direction of movement of the power means from that point at which it moves in the other direction of movement of the power means, snap-action means operating on the other end of the lever, and graduated scale means to indicate both of said points of motion, said scale means including a pointer and a scale movable relative thereto, the adjustable means causing said relative movement.

14. In a device of the kind described, a power means consisting of a pair of initially contiguous substantially flat elements, one of which is flexible to constitute a diaphragm, means connected between said elements and with them providing a space entirely filled with a thermal liquid, whereby heat changes cause the diaphragm to flex, a cut-off, means transmitting movements of the diaphragm to the cut-off including a member normally urged against the flexible diaphragm, and movable therewith a lever, a pair of fulcrums for the lever, one of which is adjustable and the other fixed, means applying forces from the member to the lever, means for adjusting the relationship between the force applying means and the lever whereby to alter both values at which the cut-off operates, a dial on said last-named means and a fixed pointer over which said dial moves, said pointer denoting on the dial the value of the diaphragm at which the cut-off is operated by pivoting of the lever about the fixed fulcrum, means for adjusting the movable fulcrum, a pointer movable with said last-named means and cooperable with the dial to indicate thereon the value of the diaphragm at which the cut-off is operated by pivoting of the lever about the movable fulcrum.

ELMER MUCHOW.